United States Patent
Zhang et al.

(10) Patent No.: US 10,823,142 B2
(45) Date of Patent: Nov. 3, 2020

(54) METHOD AND SYSTEM FOR CONTROLLING WIND TURBINE SHUTDOWN

(71) Applicant: Xinjiang Goldwind Science & Technology Co., Ltd., Xinjiang (CN)

(72) Inventors: Lei Zhang, Beijing (CN); Zhiqiang Yang, Beijing (CN); Lei Ma, Beijing (CN)

(73) Assignee: Xinjiang Goldwind Science & Technology Co., Ltd., Xinjiang (CN)

( * ) Notice: Subject to any disclaimer, the term of this patent is extended or adjusted under 35 U.S.C. 154(b) by 0 days.

(21) Appl. No.: 16/303,275

(22) PCT Filed: Apr. 10, 2018

(86) PCT No.: PCT/CN2018/082515
§ 371 (c)(1),
(2) Date: Aug. 12, 2019

(87) PCT Pub. No.: WO2019/114161
PCT Pub. Date: Jun. 20, 2019

(65) Prior Publication Data
US 2020/0011295 A1  Jan. 9, 2020

(30) Foreign Application Priority Data
Dec. 15, 2017  (CN) .............. 201711349798

(51) Int. Cl.
*F03D 7/02* (2006.01)
*H02P 9/00* (2006.01)
(Continued)

(52) U.S. Cl.
CPC ......... *F03D 7/0224* (2013.01); *F03D 7/0264* (2013.01); *H02P 9/006* (2013.01);
(Continued)

(58) Field of Classification Search
CPC ...... F03D 7/0224; F03D 7/0264; H02P 9/006; H02P 9/107; H02P 2101/15; F05B 2260/70; F05B 2260/90; F05B 2270/337
(Continued)

(56) References Cited

U.S. PATENT DOCUMENTS 8,053,917 B2 *  11/2011  Wakasa .................. F03D 7/042
290/44
8,355,824 B2 *  1/2013  Yasugi .................. F03D 7/0284
700/287

(Continued)

FOREIGN PATENT DOCUMENTS

CN  101776042 A  7/2010
CN  101893855 A  11/2010
(Continued)

OTHER PUBLICATIONS

China Patent Office, International Search Report in International Application No. PCT/CN2018/082515 (dated Jun. 22, 2018).
(Continued)

*Primary Examiner* — Pedro J Cuevas
(74) *Attorney, Agent, or Firm* — Leydig, Voit & Meyer, Ltd.

(57) ABSTRACT

Provided are a method and a system for controlling wind turbine shutdown. The method includes: obtaining, according to a preset sampling period, a grid voltage for a wind turbine, and sending the obtained grid voltage to an converter controller; determining, by the converter controller and based on the grid voltage, an operating condition of a power grid is power outage of power grid; sending, in a case that the power outage of power grid is determined, a signal indicating power outage of power grid to a main controller of a main control system of the wind turbine; and controlling, by the main controller in a case that the signal indi-
(Continued)

```
┌─────────────────────────────────────────────────────┐
│ obtaining, according to a preset sampling period,   │  S11
│ a grid voltage for a wind turbine, and sending the  │
│ obtained grid voltage to a converter controller     │
└─────────────────────────────────────────────────────┘
                          ↓
┌─────────────────────────────────────────────────────┐
│ determining, by the converter controller based on   │
│ the grid voltage, an operating condition of a power │
│ grid is power outage of power grid; sending, by the │  S12
│ converter controller in a case that the power       │
│ outage of power grid is determined, a signal        │
│ indicating power outage of power grid to a main     │
│ controller of a main control system of the wind     │
│ turbine                                             │
└─────────────────────────────────────────────────────┘
                          ↓
┌─────────────────────────────────────────────────────┐
│ controlling, by the main controller in a case that  │  S13
│ the signal indicating power outage of power grid is │
│ received, a pitch system to perform a variable-rate │
│ feathering                                          │
└─────────────────────────────────────────────────────┘
``` cating power outage of power grid is received, a pitch system to perform a variable-rate feathering.

19 Claims, 2 Drawing Sheets

(51) Int. Cl.
    *H02P 9/10*         (2006.01)
    *H02P 101/15*     (2016.01)

(52) U.S. Cl.
    CPC .......... *H02P 9/107* (2013.01); *F05B 2260/70* (2013.01); *F05B 2260/90* (2013.01); *F05B 2270/337* (2013.01); *H02P 2101/15* (2015.01)

(58) Field of Classification Search
    USPC ...................................................... 290/44, 55
    See application file for complete search history.

(56) References Cited

U.S. PATENT DOCUMENTS

| | | | | |
|---|---|---|---|---|
| 8,378,643 | B2* | 2/2013 | Arinaga | F03D 7/0276 322/29 |
| 8,502,406 | B2* | 8/2013 | Wakasa | H02P 9/48 290/44 |
| 8,704,393 | B2* | 4/2014 | Perley | F03D 7/0272 290/44 |
| 8,736,093 | B2* | 5/2014 | Kii | F03D 7/028 290/44 |
| 9,068,556 | B2* | 6/2015 | Andersen | F03D 7/0264 |
| 9,190,944 | B2* | 11/2015 | Perley | F03D 7/0272 |
| 9,528,495 | B2* | 12/2016 | Lopez Rubio | F03D 7/0224 |
| 10,662,924 | B2* | 5/2020 | Caponetti | H02K 7/183 |
| 2006/0163882 | A1 | 7/2006 | Brandt | |
| 2009/0004005 | A1 | 1/2009 | Jeppesen et al. | |
| 2009/0134624 | A1 | 5/2009 | Kerber | |
| 2010/0060000 | A1 | 3/2010 | Scholte-Wassink | |
| 2010/0078939 | A1 | 4/2010 | Kammer et al. | |
| 2011/0031748 | A1* | 2/2011 | Arinaga | F03D 7/0276 290/44 |
| 2011/0074152 | A1* | 3/2011 | Yasugi | F03D 7/0284 290/44 |
| 2011/0198846 | A1* | 8/2011 | Wakasa | H02P 9/04 290/44 |
| 2012/0087792 | A1 | 4/2012 | Cousineau et al. | |
| 2012/0134816 | A1* | 5/2012 | Andersen | F03D 7/0224 416/31 |
| 2013/0001955 | A1* | 1/2013 | Wakasa | H02P 9/04 290/55 |
| 2013/0193934 | A1* | 8/2013 | Arinaga | F03D 7/0276 322/23 |
| 2013/0234436 | A1* | 9/2013 | Kii | F03D 7/028 290/44 |
| 2014/0042745 | A1* | 2/2014 | Perley | H02P 9/04 290/44 |
| 2014/0127014 | A1 | 5/2014 | Vilbrandt et al. | |
| 2014/0167416 | A1* | 6/2014 | Perley | F03D 7/0272 290/44 |
| 2015/0035281 | A1* | 2/2015 | Lopez Rubio | F03D 7/0284 290/44 |
| 2015/0147173 | A1 | 5/2015 | Agarwal | |
| 2016/0305402 | A1* | 10/2016 | Caponetti | H02K 7/183 |
| 2019/0219033 | A1* | 7/2019 | Caponetti | F03D 7/0204 |
| 2020/0204041 | A1* | 6/2020 | Christensen | F03D 9/25 |

FOREIGN PATENT DOCUMENTS

| | | |
|---|---|---|
| CN | 102418662 A | 4/2012 |
| CN | 102748213 A | 10/2012 |
| CN | 103089541 A | 5/2013 |
| CN | 103306898 A | 9/2013 |
| CN | 103437954 A | 12/2013 |
| CN | 204663764 U | 9/2015 |
| CN | 106468242 A | 3/2017 |
| CN | 106884760 A | 6/2017 |
| CN | 106968886 A | 7/2017 |
| EP | 2072815 A1 | 6/2009 |
| EP | 2108825 A2 | 10/2009 |
| WO | WO 2006/007838 A1 | 1/2006 |

OTHER PUBLICATIONS

First Examination Report for co-pending Australian Application No. 2018260979 dated Oct. 11, 2019.
European Patent Office, Extended European Search Report in European Application No. 18793550.7 (dated Nov. 27, 2019).
Indian Patent Office, Office Action in Indian Patent Application No. 201817041647 (dated Jul. 15, 2020).

* cited by examiner

METHOD AND SYSTEM FOR CONTROLLING WIND TURBINE SHUTDOWN

CROSS-REFERENCE TO RELATED APPLICATIONS

The present application is a U.S. National Phase application under 35 U.S.C. § 371 of International Application No. PCT/CN2018/082515, filed on Apr. 10, 2018, which claims benefit to Chinese Patent Application No. 201711349798.0, filed on Dec. 15, 2017. The aforementioned patent applications are incorporated herein by reference in their entireties.

TECHNICAL FIELD

The present disclosure relates to the technical field of wind power generation, and in particular, to a method and a system for controlling wind turbine shutdown.

BACKGROUND

For designing a wind turbine, the environment in which the wind turbine is located and various loads generated under various operating conditions need to be determined, so that normal operation of the wind turbine during the whole service life can be ensured. Such designing work is a base for the wind turbine design, and is also an important research subject in control strategies of the wind turbine. With an increase in the capacity, tower height and blade length of the wind turbine, a load impact on the wind turbine also increases. This brings new great challenges to security, tower strength and manufacture cost of the wind turbines.

Therefore, load control of the wind turbine is an important issue. The service life of the wind turbine will be reduced and even a safety of the wind turbine will not be ensured in a case that the wind turbine suffers from an excessive load.

SUMMARY

A method and a system for controlling wind turbine shutdown are provided according to embodiments of the present disclosure. According to the method and the system a pitch system is controlled by a main control system to perform a variable-rate feathering under a power outage of a power grid, and it is not necessary to remove a converter safety chain from a safety chain of the wind turbine.

A method for controlling wind turbine shutdown is provided according to an aspect of an embodiment of the present disclosure. The method includes:
  obtaining, according to a preset sampling period, a grid voltage for a wind turbine, and sending the obtained grid voltage to a converter controller;
  determining, by the converter controller and based on the grid voltage, that an operating condition of a power grid is a power outage of the power grid;
  sending, by the converter controller in a case that the power outage of the power grid is determined, a signal indicating the power outage of the power grid to a main controller of a main control system of the wind turbine; and
  controlling, by the main controller in a case that the signal indicating the power outage of the power grid is received, a pitch system to perform a variable-rate feathering.

According to an aspect of an embodiment of the present disclosure, the controlling, by the main controller, a pitch system to perform variable-rate feathering, includes:
  sending, by the main controller, a variable-rate feathering instruction to a pitch controller of the pitch system; and
  controlling, by the pitch controller and according to the variable-rate feathering instruction, a pitch motor of the pitch system to perform the variable-rate feathering.

According to another aspect of embodiments of the present disclosure, a system for controlling wind turbine shutdown is provided. The system includes a grid voltage obtaining module, a converter controller, a main controller of a main control system of a wind turbine, and a pitch system.

The grid voltage obtaining module is configured to obtain, according to a preset sampling period, a grid voltage for the wind turbine, and send the obtained grid voltage to the converter controller.

The converter controller is configured to determine, based on the grid voltage, an operating condition of a power grid is a power outage of a power grid, and send, in a case that the power outage of the power grid is determined, a signal indicating the power outage of the power grid to the main controller of the main control system of the wind turbine.

The main controller is configured to control the pitch system to perform a variable-rate feathering in a case that the signal indicating the power outage of the power grid is received.

With the method and the system for controlling wind turbine shutdown according to embodiments of the present disclosure, the converter controller determines that there is a power outage of a power grid, and sends a signal indicating the power outage of the power grid to the main controller in a case that the power outage of the power grid is determined. Thereby, it is the main controller that controls the pitch system to perform the variable-rate feathering. Using the method and the system for controlling shutdown according to embodiments of the present disclosure, the main controller can control the variable-rate feathering without modifying a safety chain of the wind turbine, that is to say, without removing an converter safety chain from the safety chain of the wind turbine, so that the safety chain is unbroken in the hardware implementation. An issue that the wind turbine cannot shut down immediately when there is a converter fault for which the variable-rate feathering is not required, in a case that the converter safety chain is removed from the safety chain of the wind turbine, is addressed.

BRIEF DESCRIPTION OF THE DRAWINGS

For clearer illustration of technical solutions according to embodiments of the present disclosure, hereinafter drawings for illustrating embodiments of the present disclosure are briefly described.

DETAILED DESCRIPTION

In a case that a wind turbine is required to be shut down under a certain operating condition such as a grid power outage, a variable-rate feathering is required for the shutdown so as to reduce a load of the wind turbine. The variable-rate feathering (Variable Rate Propeller) refers to a control strategy, where a pitch angle of a blade is feathered from a 0-degree position to a 90-degree position using different feathering rates in case of a specific fault of the wind turbine, and in such process, a degree of the pitch angle serves as a threshold for using the different feathering rates.

Figure 1:
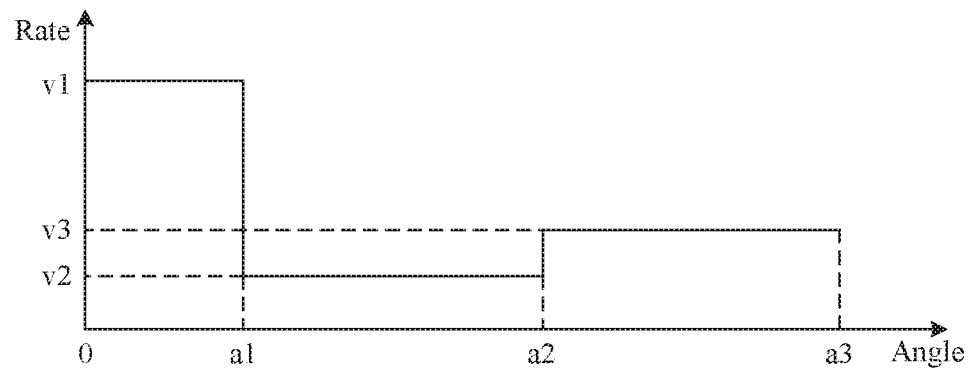
FIG. 1 is a schematic diagram showing a relationship between a pitch angle of a blade and a feathering rate in a variable-rate feathering according to an embodiment of the present disclosure.

FIG. 1 shows a schematic diagram of variable-rate feathering. As shown in FIG. 1, the horizontal axis represents the pitch angle of the blade, and the vertical axis represents the feathering rate, where a3>a2>a1, and a3=90 degrees for general cases. In the process of the variable-rate feathering, v1, v2 and v3 are the feathering rates corresponding to the pitch angle of the blade being within a range of 0 to a1, a1 to a2, and a2 to a3, respectively.

Using the variable-rate feathering, an emergency feathering with a high speed can be used at the moment a fault occurs, so as to reduce a forward load of the wind turbine. Slow featherings are adopted in a second angle range (a1 to a2) and a third angle range (a2 to a3), so as to reduce a backward load and ensure safe performance of the wind turbine during the emergency shutdown. Further, an impact on the wind turbine due to a resonant frequency between a wind condition and the wind turbine can be reduced by using the variable-rate feathering, thereby reducing a manufacture cost of a tower.

Figure 2:
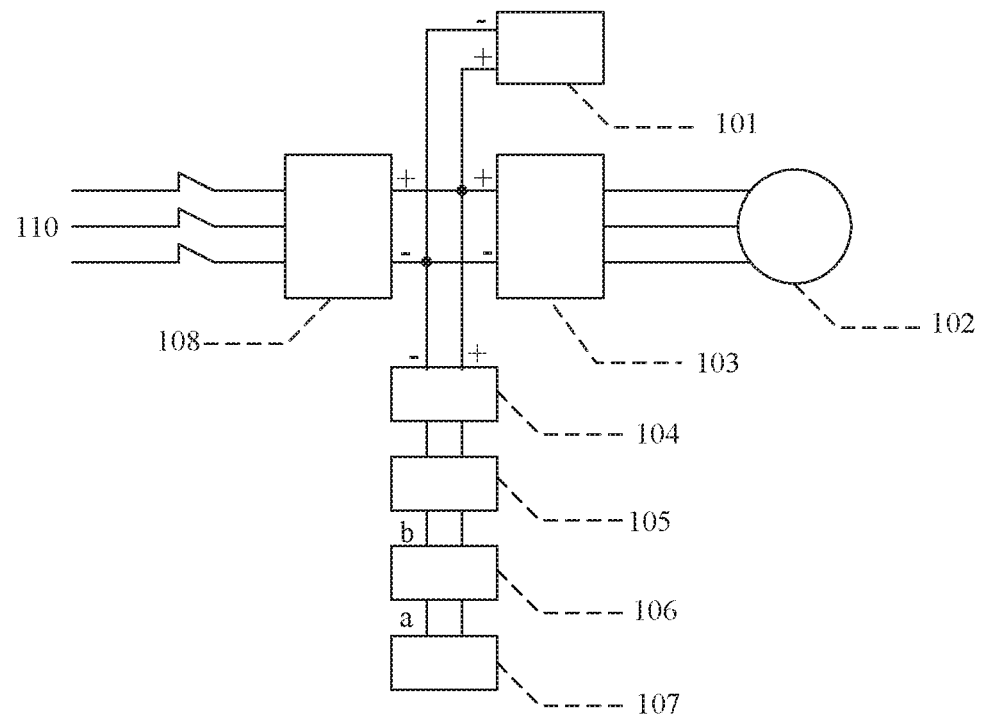
FIG. 2 is a structural schematic diagram of a control system of a wind turbine according to an embodiment of the present disclosure.

FIG. 2 shows a schematic diagram of a simplified structure of a control system of a wind turbine. The control system of the wind turbine includes a power supply system, a pitch system, a converter and a main control system. As shown in FIG. 2, the power supply system includes a grid power supply (corresponding to a grid input side 110 in the figure), a backup power supply 101, a direct current to direct current (DC/DC) power supply 104, and a charger 108. The pitch system includes a pitch motor 102, a frequency converter 103 and a pitch controller 105. The converter includes a converter controller 107. The main control system includes a main controller 106.

As shown in the figure, a positive pole (that is to say, "+" end) of outputs of the charger 108, a "+" end of the backup power supply 101, and a "+" end of the DC/DC power supply are electrically connected. A negative pole (that is to say, "−" end) of the outputs of the charger 108, a "−" end of the backup power supply 101, and a "−" end of the DC/DC power supply are electrically connected. The grid input side 110 is connected to inputs of the charger 108.

The grid input side 110 is configured to provide the wind turbine with a voltage required for operation. In a case that the wind turbine operates normally, the grid input side 110 provides alternating current power to the charger 108. The charger 108 charges the backup power supply 101, and provides operating power to the frequency converter 103 and DC/DC power supply 104. The DC/DC power supply 104 is configured to provide 24-Volt direct current power to the pitch controller 105. The backup power supply 101 is configured to continue supplying power to the pitch motor 102 in a case that the grid input side 110 is abnormal.

The pitch controller 105 is configured to control, under control of the main controller 106 or according to a determination on faults by the pitch controller itself, operation of the pitch motor 102 via the frequency converter 103, so as to control pitch adjustment or feathering. The grid input side 110 is connected to a grid end inside the converter. The converter controller 107 is configured to detect a grid voltage, provide electromagnetic torque to the wind turbine, and transmit electricity to the grid from the wind turbine.

A safety chain of the wind turbine refers to a safety chain system that protects the wind turbine. In large-scale wind turbines, reliability of a control system is improved by designing a safety chain of the control system. The safety chain of the wind turbine is the last protection of the wind turbine, and has a priority higher than software protection of the wind turbine. The safety chain system provides protection using both software and hardware independent of a computer system. Using design of negative logic, faulty nodes which may cause serious damage to the wind turbine are connected into a loop, which includes an emergency stop button installed in a main control cabinet at a bottom of the tower, an over speed module of the generator, a winding cable switch, a signal from a safety chain of the pitch system, an emergency stop button installed in a nacelle control cabinet, a vibration switch, an over speed signal of a programmable logic controller (PLC), a signal to the safety chain of the pitch system, and a bus OK signal.

In a conventional safety chain system, once one of the nodes is activated, the entire loop is powered off, so that the wind turbine enters a shutdown process of the emergency feathering. For example, in a case that the converter controller 107 detects a power outage of the power grid, the converter controller 107 triggers disconnecting a converter safety chain between the converter controller 107 and the main controller 106 (a safety chain corresponding to point a in FIG. 2), and the main controller 106 triggers disconnecting a pitch safety chain between the main controller 106 and the pitch controller 105 (a safety chain corresponding to point b in FIG. 2). In such case, the wind turbine enters an emergency feathering mode, in which the pitch system performs the emergency feathering at a fixed rate. Such approach results in an increase of the load on the wind turbine.

Figure 3:
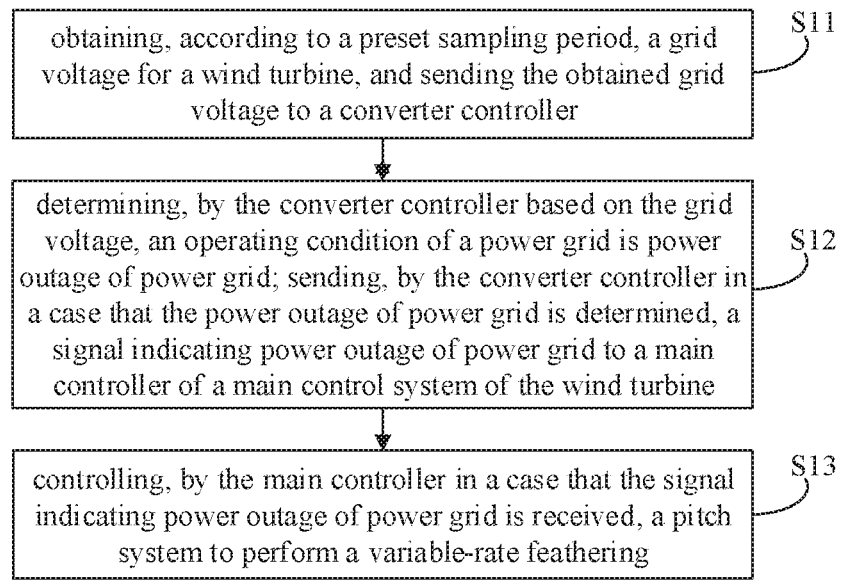
FIG. 3 is a schematic flow chart of a method for controlling wind turbine shutdown according to an embodiment of the present disclosure.

FIG. 3 is a schematic flow chart of a safety-chain-based method for controlling wind turbine shutdown according to an embodiment of the present disclosure. As shown in FIG. 3, the method for controlling shutdown according to an embodiment of the present disclosure may include the steps S11 to S13.

In step S11, a grid voltage for a wind turbine is obtained according to a preset sampling period, and the obtained grid voltage is sent to a converter controller.

In order to achieve control of the variable-rate feathering under an operating condition of a power outage of a power grid, it is required to detect the power outage of the power grid in real time. In an embodiment of the present disclosure, the voltage of the grid input side of the wind power generator is obtained by a voltage obtaining device at a high speed. The obtained voltage is sent to the converter controller, so as to realize a rapid detection of the power outage of the power grid by the converter controller.

The voltage obtaining device may be selected according to practical application requirements. For example, a voltage sensor or a voltage obtaining circuit may be used. In order to ensure the real-time detection of the power outage of the power grid, a sampling frequency of the voltage (that is to say, a reciprocal of the sampling period) should be much larger than a frequency of the grid voltage.

In an embodiment of the present disclosure, the converter controller is used for detecting the operating condition of a power outage of a power grid according to the obtained grid voltage in real-time. Thereby, rapid determination of the operating condition of the power outage of the power grid can be realized by using the voltage obtaining device which has the sampling frequency greater than the frequency of the grid voltage. Detection efficiency is effectively improved when compared with a conventional control system of the wind turbine in which the main controller or the pitch controller detects the power outage of the power grid.

In step S12, an operating condition of a power outage of a power grid is determined by the converter controller based on the grid voltage, and a signal indicating the power outage of the power grid is sent to a main controller of a main control system of the wind turbine by the converter controller in a case that the power outage of the power grid is determined.

In an embodiment of the present disclosure, the converter controller can determine whether there is a power outage of the power grid according to a change of the grid voltage obtained by the voltage obtaining device. The converter controller can immediately determine that there is a power outage in a case that the received grid voltage is 0, and sends the signal indicating the power outage of the power grid to the main controller of the main control system of the wind turbine. Thereby, the main controller can control, based on the signal indicating the power outage of the power grid, a variable-rate feathering of the wind turbine.

In step S13, a pitch system is controlled by the main controller to perform the variable-rate feathering in a case that the signal indicating the power outage of the power grid is received.

The main controller can receive the signal indicating the power outage of the power grid sent by the converter controller in a case that communications between the converter controller and the main controller is normal. In such case, the pitch system can be controlled to perform the variable-rate feathering. Shutdown of the wind turbines is achieved in a manner of the variable-rate feathering, so that the load of the wind turbine is reduced.

According to a method for controlling wind turbine shutdown according to an embodiment of the present disclosure, the main control system controls the pitch system to perform measurement on the variable-rate feathering in response to the converter controller detecting the power outage of the power grid. In addition, such solution does not require any modification on hardware of the safety chain of the wind turbine, that is to say, does not require removing the converter safety chain.

According to an embodiment of the present disclosure, when the converter controller determines that there is a power outage of a power grid and sends the signal indicating the power outage of the power grid to the main controller of the main control system of the wind turbine in step S12, the control method may further include the following step.

A converter safety chain between the converter controller and the main controller is controlled to be disconnected by the converter controller, to trigger generating a safety chain disconnection signal of the converter safety chain.

In such case, the step S13, where a pitch system is controlled by the main controller to perform the variable-rate feathering in a case that the signal indicating the power outage of the power grid is received, includes the following step.

The pitch system is controlled by the main controller to perform the variable-rate feathering in the case that the main controller detects the safety chain disconnection signal and receives the signal indicating the power outage of the power grid.

According to an embodiment of the present disclosure, in a case that the main controller detects the safety chain disconnection signal while receiving a signal indicating a power outage of a power grid, the control method further includes the following step.

An operation of disconnecting a pitch safety chain according to the safety chain disconnection signal is stopped by the main controller, where the pitch safety chain is a safety chain between the main controller and a pitch controller of the pitch system.

In an embodiment of the present disclosure, in a case that the main controller does not receive a signal indicating a power outage of a power grid, the method further includes the following step.

A safety chain (that is to say, the aforementioned pitch safety chain) between the main controller and the pitch controller is controlled to be disconnected by the main controller according to the safety chain disconnection signal detected by the main controller, to trigger the pitch system to perform the emergency feathering.

In an embodiment of the present disclosure, the converter controller may still normally control the converter safety chain when detecting a signal indicating a power outage of a power grid. In such case, the main controller may detect a corresponding safety chain disconnection signal. The main controller does not directly trigger a disconnection of the pitch safety chain according to said disconnection signal, but further determines whether the safety chain disconnection signal in such case is caused by the power outage of the power grid, in conjunction with whether the signal indicating the power outage of the power grid is received. In a case that the main controller receives the signal indicating the power outage of the power grid, it is determined that the safety chain disconnection signal is caused by the power outage of the power grid. There is no need to control the pitch safety chain to be disconnected in such case. The emergency feathering is avoided under the operating condition of the power outage of the power grid. In a case that the main controller only detects the safety chain disconnection signal and does not receive a signal indicating a power outage of a power grid, it is indicated that the safety chain disconnection signal may not be caused by a power outage of the power grid, or may be caused by a power outage of the power grid but there is an abnormity between the main controller and the converter controller. In such case, the pitch safety chain needs to be disconnected, so that the pitch system may perform the emergency feathering to realize the shutdown of the wind turbine.

In an embodiment of the present disclosure, the disconnection of the converter safety chain does not directly trigger the emergency feathering, and the main controller determines according to logic determination whether it is required to disconnect the pitch safety chain. Thereby, the variable-rate feathering is realized under the operating condition of a power outage of a power grid, while the emergency feathering of the wind turbine may still be realized according to the safety chain disconnection signal of the hardware safety chain under other faults conditions including the communications fault. Safety of the wind turbine is therefore better guaranteed.

According to an embodiment of the present disclosure, in a case that the main controller receives a signal indicating a power outage of a power grid, the control method may further include the following steps when the main controller receives the signal indicating power outage of power grid.

The signal indicating the power outage of the power grid is sent to the pitch controller of the pitch system by the main controller.

A predetermined feathering operation for the operating condition of the power outage of power grid is stopped to be performed by the pitch controller, in response to a reception of the signal indicating the power outage of the power grid.

In an embodiment of the present disclosure, in a case that the pitch controller of the pitch system also performs a detection of a power outage of a power grid, in order to avoid an automatic emergency feathering or variable-rate feathering performed by the pitch system under the operating condition of a power outage of the power grid, the main controller, in response to receiving a signal indicating a power outage of a power grid sent by the converter controller, sends the signal indicating the power outage of the power grid to the pitch controller. Thereby, the pitch controller stops, according to the signal indicating the power outage of the power grid sent by the main controller, performing the predetermined feathering operation for the operating condition of a power outage of the power grid.

According to an embodiment of the present disclosure, the control method may further include the following step when the pitch controller receives a signal indicating a power outage of a power grid.

A preconfigured voltage threshold of a backup power supply of the wind turbine for the emergency feathering is adjusted by the pitch controller from a first voltage threshold to a second voltage threshold, where the second voltage threshold is smaller than the first voltage threshold.

The first voltage threshold is a threshold for the pitch controller. A pitch motor in the pitch system is controlled to perform the emergency feathering in a case that a voltage of the backup power supply is not greater than the first voltage threshold.

A function of the backup power supply 101 is to continue supplying power to the pitch motor 102 when the grid voltage (that is to say, the grid input side shown in FIG. 2) is abnormal (including but not being limited to a power outage of the power grid). In the control system of the wind turbine, the pitch controller detects the voltage of the backup power supply. In a case that the voltage of the backup power supply 101 reaches or falls below said threshold, the pitch controller performs the operation of emergency feathering.

In an embodiment of the present disclosure, the first voltage threshold is lowered by the pitch controller in response to receiving a signal indicating a power outage of a power grid. In this manner, emergency feathering, which is performed by the pitch controller and is caused due to a low voltage of the backup power supply, is prevented, thereby avoiding a failure of variable-rate feathering in a case that variable-rate feathering is to be performed.

According to an embodiment of the present disclosure, the pitch system being controlled to perform the variable-rate feathering by the main controller includes the following steps.

A variable-rate feathering instruction is sent to the pitch controller of the pitch system by the main controller.

A pitch motor of the pitch system is controlled to perform the variable-rate feathering by the pitch controller according to the variable-rate feathering instruction.

According to an embodiment of the present disclosure, after the variable-rate feathering instruction is sent to the pitch controller of the pitch system by the main controller, the method further includes the following steps.

Pitch angles of all blades of the wind turbine are acquired by the main controller from the pitch controller, according to a preset time interval.

A blade having a feathering rate required to be adjusted and blade rate adjustment information are determined by the main controller according to a difference between the pitch angles of the blades.

A feathering rate adjusting instruction is sent to the pitch controller by the main controller, according to the blade having the feathering rate required to be adjusted and the blade rate adjustment information.

The feathering rate of the corresponding blade is adjusted by the pitch controller according to the feathering rate adjusting instruction.

According to a conventional solution of the pitch system automatically controlling the variable-rate feathering, an open-loop feathering is adopted (open-loop feathering refers to a fixed feathering rate within each angle range being sent to all the blades (three blades in general) without any adjusting). Therefore, it is difficult to ensure synchronization of the three blades. For example, in the case that the variable-rate feathering shown in FIG. 1 is used, a blade 1 may reach the critical angle a1 first and the other blades reaches a1 later. In such case, there will be an imbalance for the three blades, and such imbalance would increase the load of the wind turbine. On the other hand, in the case that a slow feathering is switched to a fast feathering (that is to say, the rate switching from V2 to V3), a blade that reaches the critical angle a2 first would be feathered at a faster speed, which may result in a large deviation between pitch angles of different blades. In such case, the main control system of the wind turbine, e.g., the pitch system, may report a fault, which causes the pitch system to perform an emergency feathering, resulting in a failure of the variable-rate feathering process. In addition, critical pitch angles of each blade are determined based on an angle value read by an encoder of the blade. Therefore, the feathering rate of the blade may be switched abnormally in a case that readings from the encoder are abnormal or jumped, which would also increase the load of the wind turbine.

In an embodiment of the present disclosure, in order to control all the blades to be consistent in the changes of the pitch angles during the feathering process, the main controller continuously acquires the pitch angle of each blade of the wind turbine via the pitch controller. The main controller sends, according to differences between the pitch angles of different blades, the feathering rate adjusting instruction of the blade to the pitch controller. Accordingly, the pitch controller can adjust the feathering rate of the blade according to said instruction in real time, so that all the pitch angles change in a consistent manner.

In the method for controlling shutdown according to an embodiment of the present disclosure, the main controller controls the variable-rate feathering and shutdown of the wind turbine under the operating condition of a power outage of power grid, and controls the feathering rate of all the blades in a closed loop. Thereby, a situation where forces on the three blades are unbalanced due to deviation among the pitch angles of the different blades in the process of blade feathering, which results in a vibration of the wind turbine, is avoided. A situation where the variable-rate feathering is switched into the emergency feathering due to a large deviation among the pitch angles of the different blades is also avoided.

According to an embodiment of the present disclosure, the pitch motor of the pitch system performing the variable-rate feathering by the pitch controller according to the variable-rate feathering instruction may include the following step.

The pitch motor is controlled by the pitch controller to perform the variable-rate feathering according to the variable-rate feathering instruction and a predetermined first variable-rate feathering rule.

In an embodiment of the present disclosure, when the main controller controls the pitch controller to perform the variable-rate feathering, the variable-rate feathering instruction may include a triggering instruction of the variable-rate feathering. The first variable-rate feathering rule is stored in advance in the pitch controller. Accordingly, in response to receiving the triggering instruction for controlling, the pitch controller may control, according to the predetermined first variable-rate feathering rule, the pitch motor to perform the variable-rate feathering.

It should be noted that the above first variable-rate feathering rule may be set or selected according to a practical requirement, for example, the variable-rate feathering scheme shown in FIG. 1 may be adopted.

According to an embodiment of the present disclosure, the variable-rate feathering instruction may further include a second variable-rate feathering rule. In such case, the pitch motor of the pitch system being controlled by the pitch controller to perform the variable-rate feathering according to the variable-rate feathering instruction may include the following step.

The pitch motor is controlled by the pitch controller to perform the variable-rate feathering according to the second variable-rate feathering rule.

In an embodiment of the present disclosure, the variable-rate feathering instruction, which is sent by the main controller when controlling the pitch controller to perform the variable-rate feathering, may include the second variable-rate feathering rule and the triggering instruction of the variable-rate feathering. That is to say, the pitch controller controls, according to the variable-rate feathering rule sent by the main controller, the pitch motor to perform the variable-rate feathering.

Figure 4:
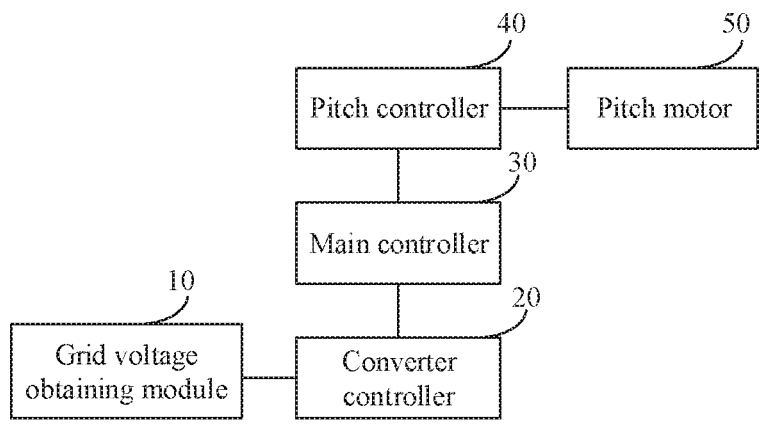
FIG. 4 is a schematic block diagram of a system for controlling wind turbine shutdown according to an embodiment of the present disclosure.

A system for controlling wind turbine shutdown is provided according to an embodiment of the present disclosure, which corresponds to the control method shown in FIG. 3. As shown in FIG. 4, the control system may include a grid voltage obtaining module 10, a converter controller 20, a main controller 30 of the main control system of the wind turbine, and a pitch system. The pitch system includes a pitch controller 40 and a pitch motor 50.

The grid voltage obtaining module 10 is configured to obtain, according to a preset sampling period, a grid voltage for the wind turbine, and send the obtained grid voltage to the converter controller 20.

The converter controller 20 is configured to determine, based on the grid voltage, an operating condition of a power outage of a power grid; and to send a signal indicating the power outage of the power grid to the main controller 30 in a case that the power outage of the power grid is determined.

The main controller 30 is configured to control the pitch system to perform a variable-rate feathering in a case that the signal indicating the power outage of the power grid is received.

According to an embodiment of the present disclosure embodiment, the converter controller 20 is further configured to, when it is determined that there is a power outage of the power grid and the signal indicating the power outage of the power grid is sent to the main controller 30, control to disconnect a converter safety chain between the converter controller 20 and the main controller 30, to trigger generating a safety chain disconnection signal of the converter safety chain.

The main controller 30 is configured to control the pitch system to perform the variable-rate feathering in a case that the safety chain disconnection signal is detected and the signal indicating the power outage of the power grid is received.

In an embodiment of the present disclosure, the main controller 30 is further configured to stop, in the case that the safety chain disconnection signal is detected and the signal indicating the power outage of the power grid is received, an operation of disconnecting a pitch safety chain according to the safety chain disconnection signal, where the pitch safety chain is a safety chain between the main controller 30 and a pitch controller 40 of the pitch system.

In an embodiment of the present disclosure, the main controller 30 is further configured to control, in a case that the signal indicating a power outage of the power grid is not received, a safety chain between the main controller 30 and the pitch controller 40 to be disconnected according to the detected safety chain disconnection signal, to trigger the pitch system to perform an emergency feathering.

According to an embodiment of the present disclosure, the main controller 30 is further configured to send, the signal indicating the power outage of the power grid to the pitch controller 40 of the pitch system in response to a reception of the signal indicating the power outage of the power grid.

The pitch controller 40 is configured to stop, according to the signal indicating the power outage of the power grid, performing a predetermined feathering operation for the operating condition of the power outage of power grid in a case that the signal indicating the power outage of the power grid is received.

According to an embodiment of the present disclosure, the pitch controller 40 is further configured to adjust, in a case that the signal indicating the power outage of the power grid is received, a preconfigured voltage threshold of a backup power supply of the wind turbine for the emergency feathering, so that the preconfigured voltage threshold is adjusted from a first voltage threshold to a second voltage threshold, where the second voltage threshold is smaller than the first voltage threshold. The first voltage threshold is a threshold for the pitch controller 40. The pitch motor 50 is controlled to perform the emergency feathering in a case that a voltage of the backup power supply is not greater than the first voltage threshold.

According to an embodiment of the present disclosure, the main controller 30 is configured to send a variable-rate feathering instruction to the pitch controller 40 of the pitch system.

The pitch controller 40 is configured to control, according to the variable-rate feathering instruction, a pitch motor of the pitch system to perform the variable-rate feathering.

In an embodiment of the present disclosure, the main controller 30 is further configured to, after sending the variable-rate feathering instruction to the pitch controller 40 of the pitch system, obtain pitch angles of blades of the wind turbine according to a preset time interval and from the pitch controller 40, determine a blade having a feathering rate required to be adjusted and blade rate adjustment information according to a difference between the pitch angles of the blades, and send a feathering rate adjusting instruction to the pitch controller 40 according to the blade having the feathering rate required to be adjusted and the blade rate adjustment information.

The pitch controller 40 is further configured to adjust the feathering rate of the blade according to the feathering rate adjusting instruction corresponding thereto.

According to an embodiment of the present disclosure, the pitch controller 40 is configured to control, according to the variable-rate feathering instruction and a predetermined first variable-rate feathering rule, the pitch motor 50 to perform the variable-rate feathering.

According to an embodiment of the present disclosure, the variable-rate feathering instruction may further include a second variable-rate feathering rule. In such case, the pitch controller 40 is configured to control, according to the second variable-rate feathering rule, the pitch motor 50 to perform the variable-rate feathering.

It should be noted that descriptions of specific functions of various parts in the system for controlling shutdown according to embodiments of the present disclosure were also discussed above with respect to embodiments of the method for controlling shutdown.

The functional blocks shown in the block diagrams described above may be implemented using hardware, software, firmware, or a combination thereof. In case of being implemented in hardware, it may be, for example, an electronic circuit, an application specific integrated circuit (ASIC), suitable firmware, a plug-in, and functional cards. In case of being implemented in software, the element according to the present disclosure may be a program or a code segment configured to perform a required task. The program or code segment may be stored in a machine-readable medium, or may be transmitted over a transmission medium or communication link via a data signal carried in the signal carrier. The "machine-readable medium" may include any medium that can store or transfer information. The machine-readable medium may include, for example, an electronic circuit, a semiconductor memory device, a read-only memory (ROM), a flash memory, an erasable ROM (EROM), a floppy disk, a CD-ROM, an optical disk, a hard disk, an optical fiber medium, or a radio frequency (RF) link, and the like. The code segment may be downloaded via a computer network such as the Internet and an intranet.

It should be noted that, relationship terms such as "first", "second" and the like are only used herein to distinguish one entity or operation from another, rather than to necessitate or imply that an actual relationship or order exists between the entities or operations. Furthermore, terms such as "include", "comprise" or any other variants thereof are meant to be non-exclusive. Therefore, a process, a method, an article or a device including a series of elements include may not only the disclosed elements but may also include other elements that are not expressly enumerated, or may further include inherent elements of the process, the method, the article or the device. Unless expressively limited, the statement "including a . . . " does not exclude the case that other similar elements may exist in the process, the method, the article or the device other than enumerated elements.

It should also be noted that the embodiments of the present disclosure discussed herein merely describe certain exemplary methods or systems based on a series of steps or apparatuses. The present disclosure is not limited to an order of the above steps. That is to say, the steps may be performed in an order mentioned in the embodiment or in an order different from the embodiment, or multiple steps may be simultaneously performed.

The present disclosure may be implemented in other specific forms without deviating from the spirit thereof. Accordingly, the exemplary embodiments discussed in the present disclosure are to be considered in all respects as illustrative and not intended to limit the present disclosure.

The invention claimed is:

1. A method for controlling wind turbine shutdown, comprising:
controlling, by a main controller of a main control system of a wind turbine in a case where the main controller receives a signal indicating a power outage of a power grid, a pitch system to perform a variable-rate feathering without triggering an operation of disconnecting a pitch safety chain;
wherein the signal indicating the power outage of the power grid is sent to the main controller by a converter controller in a case where the power outage of the power grid is determined by the converter controller; and
wherein the pitch safety chain is a safety chain between the main controller and a pitch controller of the pitch system.

2. The method according to claim 1, wherein the controlling further comprises:
controlling, by the main controller, the pitch system to perform the variable-rate feathering without triggering the operation of disconnecting the pitch safety chain in a case where the main controller detects a safety chain disconnection signal and receives the signal indicating the power outage of the power grid, wherein the safety chain disconnection signal is generated by the converter controller and is for disconnecting a converter safety chain between the converter controller and the main controller when the signal indicating the power outage of the power grid is sent to the main controller by the converter controller.

3. The method according to claim 2, wherein the method further comprises:
stopping, by the main controller, a process of triggering the operation of disconnecting the pitch safety chain according to the safety chain disconnection signal in the case where the main controller detects the safety chain disconnection signal and receives the signal indicating the power outage of the power grid.

4. The method according to claim 2, wherein the method further comprises:
controlling, by the main controller according to the safety chain disconnection signal detected by the main controller, the pitch safety chain to be disconnected to trigger the pitch system to perform a constant-rate feathering, in a case where the main controller does not receive a signal indicating a power outage of the power grid.

5. The method according to claim 1, wherein in the case where the main controller receives the signal indicating the power outage of the power grid, the method further comprises:
sending, by the main controller, the signal indicating the power outage of the power grid to the pitch controller of the pitch system to facilitate the pitch controller stopping performance of a predetermined feathering operation.

6. The method according to claim 1, wherein the controlling further comprises:
sending, by the main controller, a variable-rate feathering instruction to the pitch controller to facilitate the pitch controller controlling a pitch motor of the pitch system to perform variable-rate feathering according to the variable-rate feathering instruction.

7. The method according to claim 6, wherein the controlling further comprises:
controlling, by the main controller, the pitch system to perform the variable-rate feathering in a closed loop, so that a difference between pitch angles of blades of the wind turbine is smaller than a preset angle.

8. The method according to claim 7, wherein the controlling further comprises:
acquiring, by the main controller after sending the variable-rate feathering instruction to the pitch controller, feathering information of a blade fed back from the pitch controller according to a preset time interval;
generating, by the main controller, a feathering rate adjusting instruction according to the feathering information of the blade fed back from the pitch controller;
sending, by the main controller, the feathering rate adjusting instruction to the pitch controller to facilitate the pitch controller adjusting a feathering rate of the blade according to the feathering rate adjusting instruction, wherein the difference between the pitch angles of the blades after the adjustment is smaller than the preset angle.

9. The method according to claim 1, wherein the signal indicating the power outage of the power grid is sent to the main controller by the converter controller in response to the power outage of the power grid being determined by the converter controller according to a grid voltage for the wind turbine obtained based on a preset sampling period.

10. A method for controlling wind turbine shutdown, comprising:
receiving, by a pitch controller, a variable-rate feathering instruction sent by a main controller of a main control system of a wind turbine, wherein the variable-rate feathering instruction is sent in a case where the main controller receives a signal indicating a power outage of a power grid sent by a converter controller; and
controlling, by the pitch controller according to the variable-rate feathering instruction, a pitch motor of a pitch system to perform a variable-rate feathering.

11. The method according to claim 10, further comprising:
receiving, by the pitch controller, a signal indicating the power outage of the power grid sent by the main controller, wherein the signal indicating the power outage of the power grid is sent by the main controller in the case where the main controller receives the signal indicating the power outage of the power grid sent by the converter controller; and
stopping, by the pitch controller according to the signal indicating the power outage of the power grid sent by the main controller, performance of a predetermined feathering operation.

12. The method according to claim 11, wherein after receiving the signal indicating the power outage of the power grid sent by the main controller, the method further comprises:
adjusting, by the pitch controller, a preconfigured voltage threshold of a backup power supply of the wind turbine for an emergency constant-rate feathering, from a first voltage threshold to a second voltage threshold, wherein the second voltage threshold is smaller than the first voltage threshold;
wherein the pitch motor of the pitch system is controlled to perform the emergency constant-rate feathering in a case where a voltage of the backup power supply is not greater than the first voltage threshold.

13. The method according to claim 10, wherein after controlling the pitch motor of the pitch system to perform the variable-rate feathering, the method further comprises:
feeding, by the pitch controller, feathering information of a blade back to the main controller according to a preset time interval;
receiving, by the pitch controller, a feathering rate adjusting instruction sent by the main controller, wherein the feathering rate adjusting instruction is generated by the main controller according to the feathering information of the blade fed back by the pitch controller; and
adjusting a feathering rate of the blade according to the feathering rate adjusting instruction, so that a difference between pitch angles of blades after the adjustment is smaller than a preset angle.

14. A system for controlling wind turbine shutdown, comprising:
a main controller of a main control system of a wind turbine; and
a converter controller;
wherein the main controller is configured to control a pitch system to perform a variable-rate feathering without triggering an operation of disconnecting a pitch safety chain in a case where the main controller receives a signal indicating a power outage of a power grid;
wherein the converter controller is configured to send the signal indicating the power outage of the power grid to the main controller in response to the power outage of the power grid being determined by the converter controller; and
wherein the pitch safety chain is a safety chain between the main controller and a pitch controller of the pitch system.

15. The system according to claim 14, wherein the main controller is configured to control the pitch system to perform the variable-rate feathering without triggering the operation of disconnecting the pitch safety chain in a case where the main controller detects a safety chain disconnection signal and receives the signal indicating the power outage of the power grid;
wherein the safety chain disconnection signal is generated by the converter controller and for disconnecting a converter safety chain between the converter controller and the main controller when the signal indicating the power outage of the power grid is sent to the main controller by the converter controller.

16. The system according to claim 15, wherein the main controller is further configured to stop an operation of triggering a disconnection of the pitch safety chain according to the safety chain disconnection signal in the case where the main controller detects the safety chain disconnection signal and receives the signal indicating the power outage of the power grid.

17. The system according to claim 15, wherein the main controller is further configured to control, according to the safety chain disconnection signal detected by the main controller, the pitch safety chain to be disconnected to trigger the pitch system to perform an emergency feathering, in a case where the main controller does not receive a signal indicating a power outage of the power grid.

18. The system according to claim 14, wherein the main controller is further configured to send a signal indicating the power outage of the power grid to the pitch controller of the pitch system, so that the pitch controller stops, according to the signal indicating the power outage of the power grid sent by the main controller, performance of a predetermined feathering operation.

19. The system according to claim 14, wherein the main controller is configured to control the pitch system to perform the variable-rate feathering in a closed loop, so that a difference between pitch angles of blades of the wind turbine is smaller than a preset angle.

* * * * *